(12) United States Patent
Shinseki

(10) Patent No.: US 11,917,105 B2
(45) Date of Patent: *Feb. 27, 2024

(54) SYSTEM AND METHOD FOR PROVIDING CHAT-BASED CUSTOMER CALLBACKS

(71) Applicant: Virtual Hold Technology Solutions, LLC, Akron, OH (US)

(72) Inventor: Kevin Shinseki, San Carlos, CA (US)

(73) Assignee: Virtual Hold Technology Solutions, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,982

(22) Filed: Mar. 31, 2022

(65) Prior Publication Data

US 2022/0294908 A1    Sep. 15, 2022

Related U.S. Application Data

(63) Continuation of application No. 17/237,342, filed on Apr. 22, 2021, now Pat. No. 11,356,559, which is a continuation of application No. 16/058,044, filed on Aug. 8, 2018, now Pat. No. 11,012,568, which is a continuation-in-part of application No. 14/532,001, filed on Nov. 4, 2014, now Pat. No. 10,375,245, which is a continuation-in-part of application No. 13/659,902, filed on Oct. 24, 2012, now Pat. No. 8,938,221, which is a continuation-in-part of application No. 13/479,870, filed on May 24, 2012, now Pat. No. 9,055,149, and a continuation-in-part of application No. 13/446,758, filed on Apr. 13, 2012, now Pat. No. 8,792,866, said application No.
(Continued)

(51) Int. Cl.
| | |
|---|---|
| *H04M 3/523* | (2006.01) |
| *G06Q 10/10* | (2023.01) |
| *G06Q 30/016* | (2023.01) |
| *H04L 51/02* | (2022.01) |
| *H04L 51/046* | (2022.01) |
| *H04L 51/08* | (2022.01) |
| *H04L 51/18* | (2022.01) |
| *H04M 3/51* | (2006.01) |

(52) U.S. Cl.
CPC .......... *H04M 3/5231* (2013.01); *G06Q 10/10* (2013.01); *G06Q 30/016* (2013.01); *H04L 51/02* (2013.01); *H04L 51/046* (2013.01); *H04L 51/08* (2013.01); *H04L 51/18* (2013.01); *H04M 3/5191* (2013.01); *H04M 3/5238* (2013.01)

(58) Field of Classification Search
CPC ............. H04M 3/5231; H04M 3/5191; H04M 3/5238; H04M 3/5232–5236; G06Q 10/10; G06Q 30/016; H04L 51/02; H04L 51/046; H04L 51/08; H04L 51/18
See application file for complete search history.

(56) References Cited

U.S. PATENT DOCUMENTS

| | | |
|---|---|---|
| 7,761,323 B2 | 7/2010 | Rafter et al. |
| 8,345,852 B2 | 1/2013 | Famous |
| | (Continued) | |

*Primary Examiner* — Jerry B Dennison

(57) ABSTRACT

A system for providing chat-based customer callbacks, wherein a callback application server transmits prompts and receives requests for customer callbacks, an interaction manager determines agent availability and arranges callback handling, and a session management server initiates callbacks, and methods for providing chat-based customer callbacks using the system of the invention.

18 Claims, 16 Drawing Sheets

Related U.S. Application Data

13/479,870 is a continuation-in-part of application No. 12/320,517, filed on Jan. 28, 2009, now Pat. No. 8,213,911, said application No. 13/446,758 is a continuation of application No. 12/320,517, filed on Jan. 28, 2009, now Pat. No. 8,213,911.

(56) References Cited

U.S. PATENT DOCUMENTS

| | | | |
|---|---|---|---|
| 8,413,058 B1 | 4/2013 | Lewis et al. | |
| 8,467,502 B2 | 6/2013 | Sureka et al. | |
| 8,573,474 B2 | 11/2013 | Vasquez et al. | |
| 8,620,913 B2 | 12/2013 | Hough et al. | |
| 8,896,659 B2 | 11/2014 | Pang | |
| 8,938,221 B2 * | 1/2015 | Brazier | G06Q 10/02 455/414.1 |
| 8,995,644 B2 | 3/2015 | Ristock et al. | |
| 9,124,699 B2 | 9/2015 | Youd et al. | |
| 9,135,642 B1 | 9/2015 | Irwin et al. | |
| 9,143,614 B2 * | 9/2015 | Williams | H04M 3/5191 |
| 9,185,221 B1 | 11/2015 | Billman | |
| 9,317,855 B2 * | 4/2016 | Altberg | G06Q 30/0276 |
| 9,348,814 B2 | 5/2016 | Sandei et al. | |
| 9,680,996 B2 | 6/2017 | Kumar et al. | |
| 9,955,022 B2 | 4/2018 | Jain | |
| 10,257,355 B1 * | 4/2019 | Merritt | G06N 5/022 |
| 11,012,568 B2 * | 5/2021 | Shinseki | G06Q 10/10 |
| 11,218,594 B1 * | 1/2022 | Sekar | G06F 40/35 |
| 11,356,559 B2 * | 6/2022 | Shinseki | H04M 3/5191 |
| 2001/0054388 A1 | 12/2001 | Qian | |
| 2006/0167729 A1 * | 7/2006 | Rafter | G06Q 10/1095 705/7.19 |
| 2015/0085872 A1 | 3/2015 | Palawat et al. | |
| 2015/0189088 A1 * | 7/2015 | Surridge | G06Q 10/063112 379/265.12 |
| 2017/0324867 A1 * | 11/2017 | Tamblyn | H04L 65/1093 |
| 2017/0324868 A1 | 11/2017 | Tamblyn et al. | |
| 2018/0212904 A1 * | 7/2018 | Smullen | H04L 67/02 |
| 2019/0311036 A1 * | 10/2019 | Shanmugam | G06F 40/56 |
| 2019/0325868 A1 * | 10/2019 | Lecue | G10L 25/63 |
| 2020/0349614 A1 | 11/2020 | Batcha et al. | |
| 2022/0014627 A1 * | 1/2022 | Shinseki | H04L 51/02 |
| 2022/0294908 A1 * | 9/2022 | Shinseki | H04M 3/5238 |

* cited by examiner

SYSTEM AND METHOD FOR PROVIDING CHAT-BASED CUSTOMER CALLBACKS

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/237,342
Ser. No. 16/058,044
Ser. No. 14/532,001
Ser. No. 13/659,902
Ser. No. 13/479,870
Ser. No. 12/320,517
Ser. No. 13/446,758

BACKGROUND

Field of the Art

The disclosure relates to the field of contact center customer relations, and more particularly to the field of providing customer callbacks to users via chat-based interactions.

Discussion of the State of the Art

Many businesses use groups of service representatives for communicating with clients who initiate communications with the business, such as by telephone calls. To most efficiently use the time and skills of each service representative, the service representatives may be organized into groups based on a skill set. For example, the groupings may be based on the representative's ability to handle client issues such as the opening of new accounts, billing issues and customer service issues on existing accounts.

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are exacerbating to a client at best. It takes significant time to navigate the layered menus of voice prompts.

Second, waiting on-hold while the telephone connection is maintained in queue for connection to a service agent is also exacerbating to a client at best.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative slightly less exasperating, it does not address the inconvenience of having to navigate an irritatingly slow and usually complicated voice prompt menu to enter the queue.

What is needed is a system and various methods for providing a callback cloud and related services that overcome the limitations of the prior art noted above.

SUMMARY

Accordingly, the inventor has conceived, and reduced to practice, various systems and methods for providing chat-based customer callbacks.

According to a preferred embodiment, a system for providing chat-based customer callbacks is disclosed, comprising: a callback application server comprising at least a processor, a memory, and a plurality of programming instructions stored in the memory and operating on the processor, wherein the programming instructions, when operating on the processor, cause the processor to: transmit an interactive prompt to a chat session, the prompt comprising an option for a user to request a callback; receive a callback request from the chat session, the callback request comprising at least an indicia of a specific callback provider from whom a callback is requested, the callback request further comprising an indicia of when a callback should be made; direct the callback request to an interaction manager; an interaction manager comprising at least a processor, a memory, and a plurality of programming instructions stored in the memory and operating on the processor, wherein the programming instructions, when operating on the processor, cause the processor to: determine callback availability for agents in a contact center, the callback availability being based on the status of a current interaction queue at the contact center and the indicia of when a callback should be made; select an agent to be used for the callback, the agent being selected based on the determined availability; direct a session management server to initiate a callback; a session management server comprising at least a processor, a memory, and a plurality of programming instructions stored in the memory and operating on the processor, wherein the programming instructions, when operating on the processor, cause the processor to: perform a callback at a specified time and using a specified agent.

According to another preferred embodiment, a method for providing chat-based customer callbacks is disclosed, comprising the steps of: transmitting, using a callback application server, an interactive prompt to a chat session, the interactive prompt comprising an option to request a callback; receiving a callback request from the chat session, the callback request comprising an indicia of when a callback should be made; determining, using an interaction manager, callback availability for agents in a contact center, the callback availability being based on the status of a current interaction queue at the contact center and the indicia of when a callback should be made; selecting an agent to be used for the callback, the agent being selected based on the determined availability; performing a callback using a session management server at a specified time and using a specified agent.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
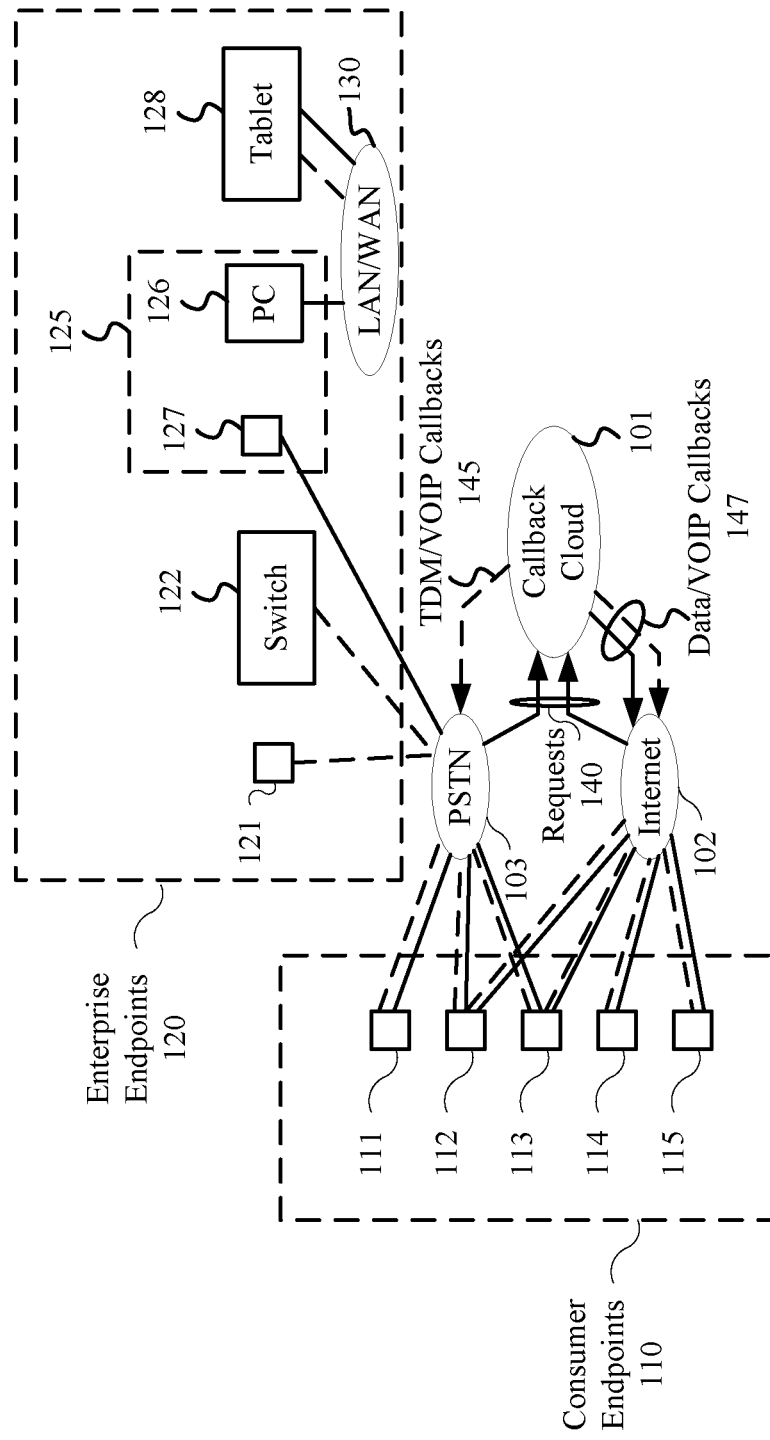
FIG. 1 is a block diagram illustrating an exemplary system architecture for operating a callback cloud, according to one aspect.

The inventor has conceived, and reduced to practice, various systems and methods for providing chat-based customer callbacks.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram of a preferred embodiment of the invention, illustrating an exemplary architecture of a system 100 for providing a callback cloud service. According to the embodiment, callback cloud 101 may receive requests 140 via a plurality of communications networks such as a public switched telephone network (PSTN) 103 or the Internet 102. Such communications networks may be connected to a plurality of consumer endpoints 110 and enterprise endpoints 120 as illustrated, according to the particular architecture of communication network involved. Exemplary consumer endpoints 110 may include, but are not limited to, traditional telephones 111, cellular telephones 112, mobile tablet computing devices 113, laptop computers 114, or desktop personal computers (PC) 115. Such devices may be connected to respective communications networks via a variety of means, which may include telephone dialers, VOIP telecommunications services, web browser applications, SMS text messaging services, or other data communications services. It will be appreciated by one having ordinary skill in the art that such means of communication are exemplary, and many alternative means are possible and becoming possible in the art, any of which may be utilized as an element of system 100 according to the invention. A PSTN 103 or the Internet 102 (and it should be noted that not all alternate connections are shown for the sake of simplicity, for example a desktop PC 126 may communicate via the Internet 102) may be further connected to a plurality of enterprise endpoints 120, which may comprise cellular telephones 121, telephony switch 122, desktop environment 125, internal Local Area Network (LAN) or Wide-Area Network (WAN) 130, and mobile devices such as tablet computing device 128. As illustrated, desktop environment 125 may include both a telephone 127 and a desktop computer 126, which may be used as a network bridge to connect a telephony switch 122 to an internal LAN or WAN 130, such that additional mobile devices such as tablet PC 128 may utilize switch 122 to communicate with PSTN 102. Telephone 127 may be connected to switch 122 or it may be connected directly to PSTN 102. It will be appreciated that the illustrated arrangement is exemplary, and a variety of arrangements that may comprise additional devices known in the art are possible, according to the invention. Callback cloud 101 may respond to requests 140 received from communications networks with callbacks appropriate to the technology utilized by such networks, such as data or Voice over Internet Protocol (VOIP) callbacks 145, 147 sent to Internet 102, or time-division multiplexing (TDM) such as is commonly used in cellular telephony networks such as the Global System for Mobile Communications (GSM) cellular network commonly used worldwide, or VOIP callbacks to PSTN 103. Data callbacks 147 may be performed over a variety of Internet-enabled communications technologies, such as via e-mail messages, application pop-ups, or Internet Relay Chat (IRC) conversations, and it will be appreciated by one having ordinary skill in the art that a wide variety of such communications technologies are available and may be utilized according to the invention. VOIP callbacks may be made using either or both traditional telephony networks such as PSTN 103 or over VOIP networks such as Internet 102, due to the flexibility to the technology involved and the design of such networks. It will be appreciated that such callback methods are exemplary, and that callbacks may be tailored to available communications technologies according to the invention.

Figure 9:
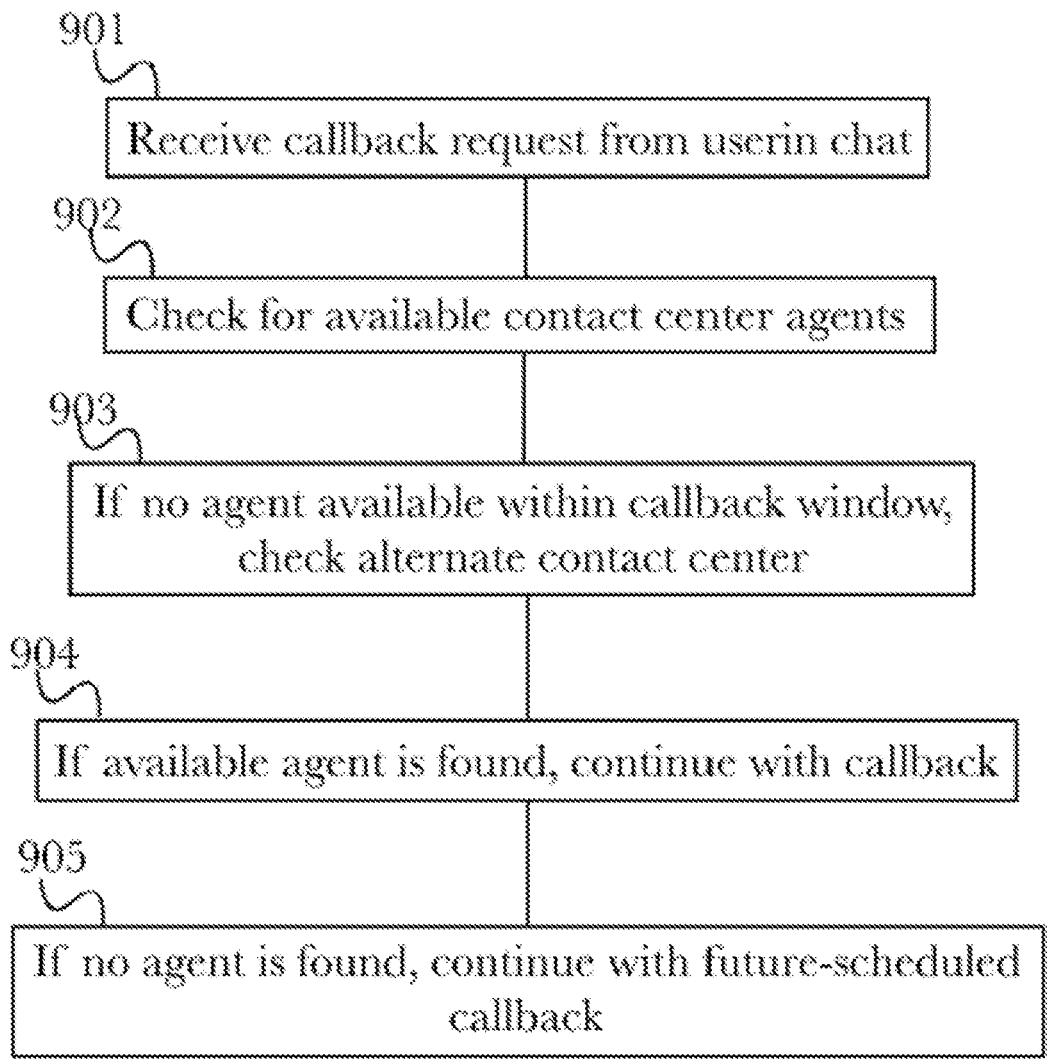
FIG. 9 is a flow diagram illustrating an exemplary method for using multiple contact centers to fulfill a chat request from a chat user, according to one aspect.
Figure 10:
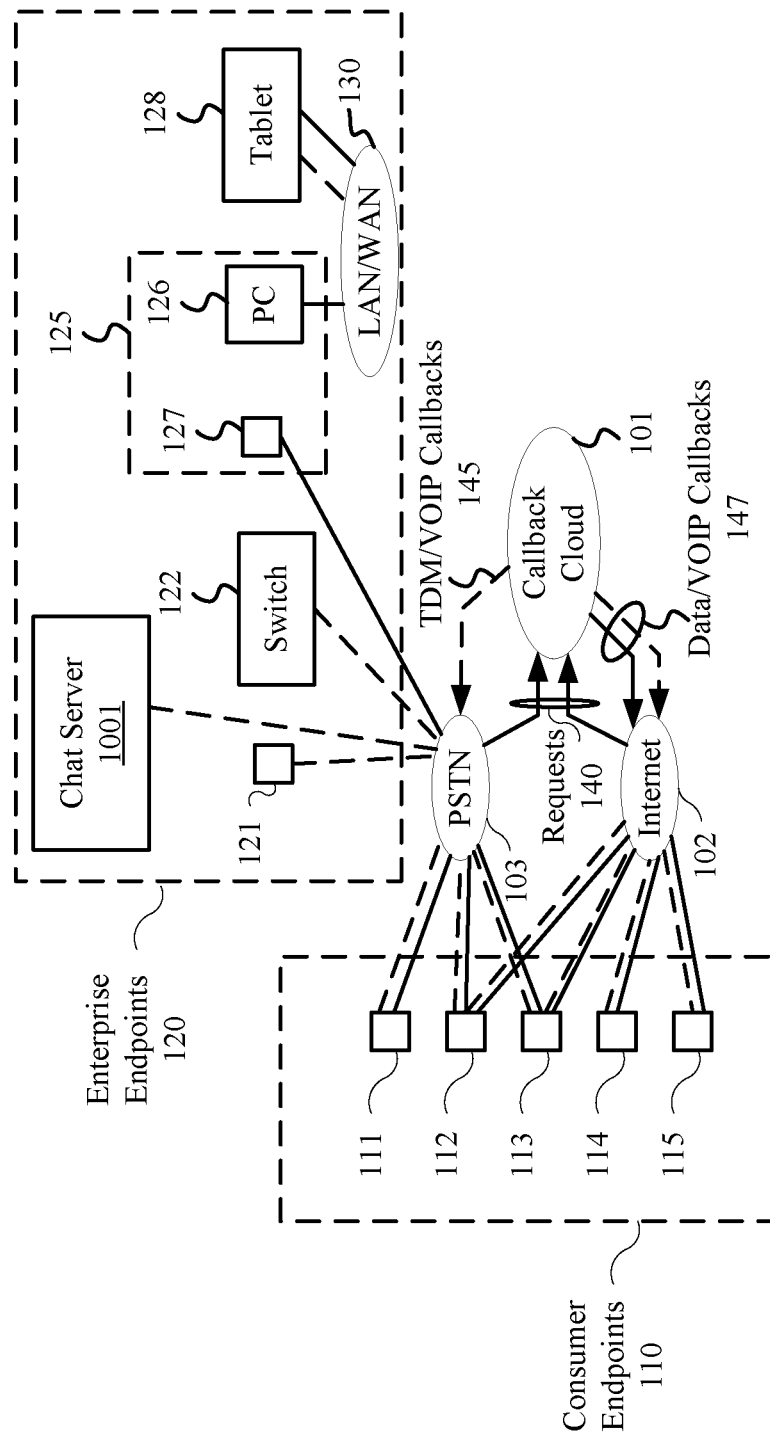
FIG. 10 is a block diagram illustrating an exemplary system architecture for operating a callback cloud in connection with a chat server operated by an enterprise, according to one aspect.

FIG. 10 is a block diagram illustrating an exemplary system architecture 1000 for operating a callback cloud 101 in connection with a chat server 1001 operated by an enterprise 120, according to one aspect. According to the aspect, an enterprise may deploy an on-premises chat server 1001 to operate any of a number of customer-facing chat services such as (for example, including but not limited to) SMS-based messaging via PSTN 103 or IP-based chat via the Internet 102, which may in turn comprise a number of arrangements such as web-based chat with which a customer may interact via a web browser (for example, on a mobile device 112, 113 or personal computer 114, 115), or a chat app that may be installed by a customer on their device and used for chat interactions with the enterprise, or may provide integrated chat functionality using pre-existing chat services or programs, such as (for example, including but not limited to) providing a means for customers to chat with enterprise agents via SKYPE™, FACEBOOK MESSENGER™, TELEGRAM™, WHATSAPP™, or any of a number of messaging services. A chat interaction with a customer may be connected by chat server 1001 to an agent workstation 125 so the customer may chat directly with a contact center agent, or they may chat with automated systems such as a virtual assistant or "chat bot" operated by chat server 1001, for example to interactively assist with basic tasks such as requests for account information or general questions. If a customer is unable to reach resolution via chat alone, they may request (or be proactively provided) a callback, which may then be handled according to the various methods described below (referring to FIGS. 3-9).

Figure 11:
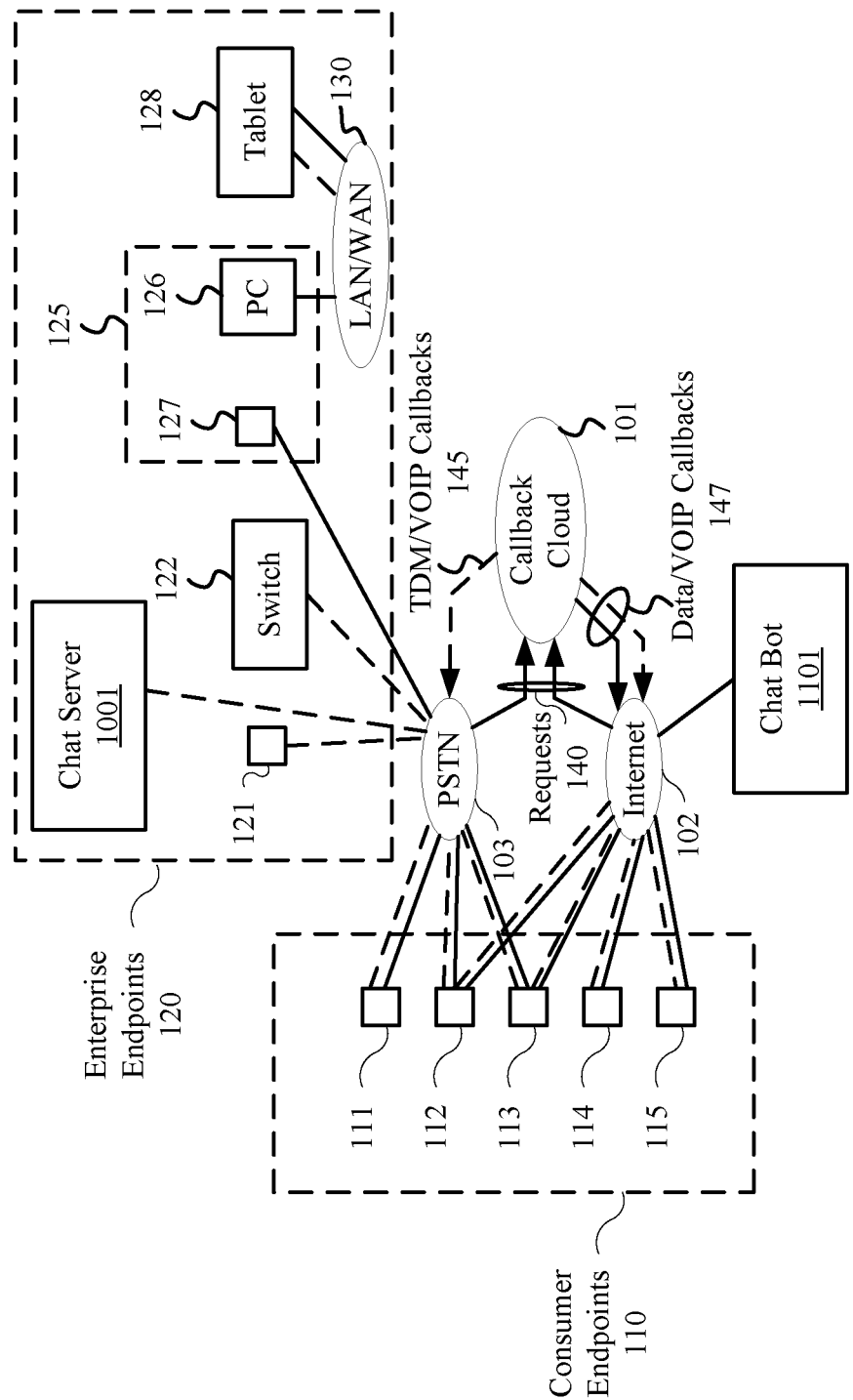
FIG. 11 is a block diagram illustrating an exemplary system architecture for operating a callback cloud in connection with a chat bot operated independently of an enterprise contact center, according to one aspect.

FIG. 11 is a block diagram illustrating an exemplary system architecture 1100 for operating a callback cloud 101 in connection with a chat bot 1101 operated independently of an enterprise contact center 120, according to one aspect. According to the aspect, a chat bot 1101 may be operated by an independent vendor such as a chat service or another enterprise independent of a contact center 120. A chat bot 1101 may provide interactive, automated chat assistance for users and may optionally be tailored for a specific purpose, such as to assist with billing concerns or technical support, or may be tailored to customers of a particular enterprise such as to assist customers with specific products or services. If a customer is unable to reach resolution via chat alone, they may request (or be proactively provided) a callback, which may then be handled according to the various methods described below (referring to FIGS. 3-9), for example chat bot 1101 may connect the customer to an enterprise 120 for further assistance.

Figure 12:
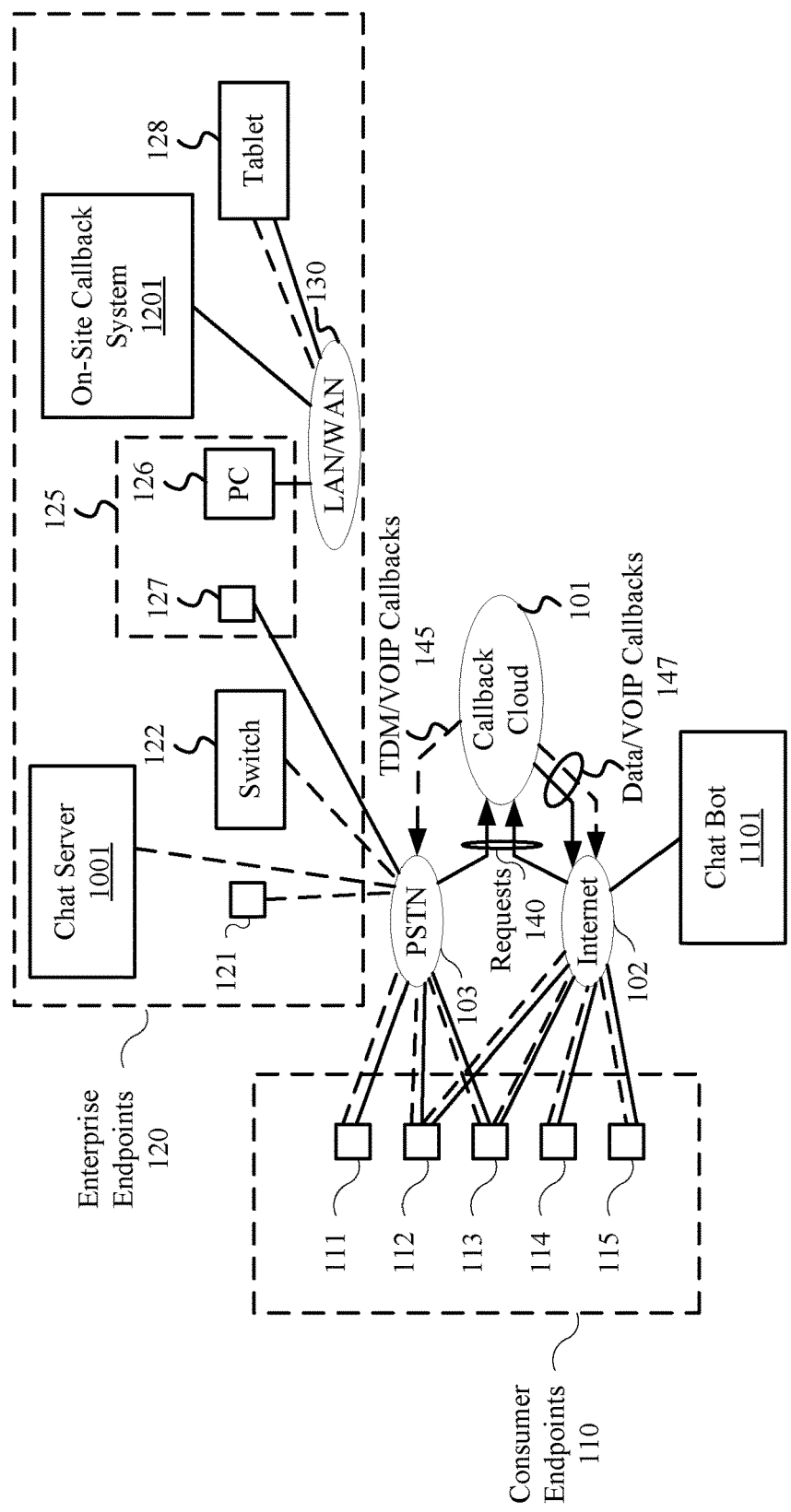
FIG. 12 is a block diagram illustrating an exemplary system architecture for operating an on-premises callback system alongside a chat server operated by an enterprise, according to one aspect.

FIG. 12 is a block diagram illustrating an exemplary system architecture 1200 for operating an on-premises callback system 1210 alongside a chat server 1001 operated by an enterprise 120, according to one aspect. According to the aspect, rather than a callback cloud 101 operating outside an enterprise environment, an on-premises callback system 1210 may be utilized such as a pre-existing automated callback scheduler (that may be already present in a contact center architecture) or a local implementation of callback cloud features (as described below in FIG. 2). This local callback system 1210 may be used to handle customer callback requests including user-requested callbacks and proactively-offered callbacks from chat server 1001, fulfilling callbacks and connecting customers with other endpoints 120 as needed to reach full issue resolution (for example, according to the methods described below in FIGS. 3-9).

Figure 2:
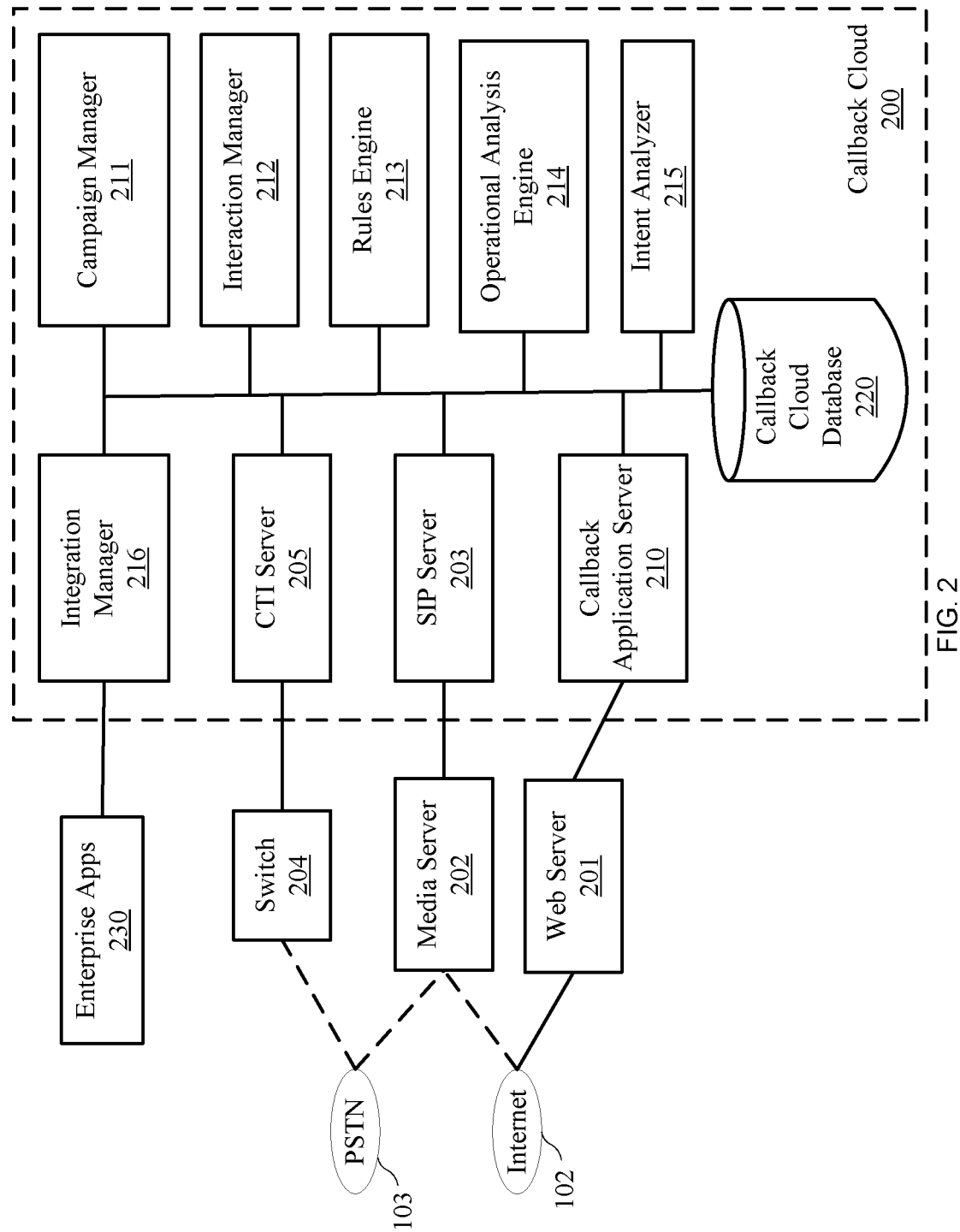
FIG. 2 is a block diagram illustrating an exemplary architecture of a callback cloud, according to one aspect.

FIG. 2 is a block diagram illustrating an exemplary architecture of a callback cloud 200, according to a preferred embodiment of the invention. According to the embodiment, a callback cloud 200 may comprise a plurality of front-end elements to accept incoming data requests, such as web server 201 which may accept requests from Internet 102, media server 202 which may accept requests from either Internet 102 or a PSTN 103, or telephony switch 204 which may accept requests from a PSTN 103. It will be appreciated that such elements are exemplary, and additional or alternate arrangements accepting requests from a variety of communications networks are possible according to the invention. Data requests may be passed from front-end services to secondary services for processing, such as CTI server 205, SIP server 203, or callback application server 210, each of which may translate incoming request data for interaction with a plurality of computer services, such as campaign manager 211 which may manage information about requestors such as when or why an interaction should take place between two resources, interaction manager 212 which may handle matching, distribution, and queuing of interactions with a plurality of processing parties such as agents, chatbots, or other virtual assistants or adding a request to a callback queue if a selected resource is busy, rules engine 213 which may receive incoming requests and apply predetermined or configurable rules to determine possible actions, such as when a callback is to be performed, to what available contact method a callback should be made, what to do if a callback attempt fails, how to prioritize a callback in a queue, or other relevant actions, operational analysis engine 214 which may work in conjunction with an intent analyzer 215 for the purpose of handling decision-making logic such as selecting and assigning resources to handle callback requests, such that callbacks will be handled by the most relevant and capable available resource. Resource in this case may refer to an individual, a contact center agent, an automated response application, chatbot, or other relevant party according to the nature of the callback request and, optionally, any rules assigned to the callback during processing as described previously. Callback cloud 200 may further comprise a database 220, which may collect and store requestor data and may be any of a variety of database types, such as an SQL-based relational database or distributed nonrelational database such as Hadoop HDB. Callback cloud 200 may further comprise an integration server 216, which may connect to a plurality of enterprise applications 230. In general, switch 204 and media server 202 are examples of, and act as, media handling endpoints of callback cloud 200. Similarly, CTI server 205 and SIP server 203 are examples of, and act as, signaling components that may be further characterized as session management components that may be operated by a session management server (not shown) either individually or in any combination. Operational analysis engine 214 is a software component used to analyze operational data such as call arrival rates, callback request and completion rates, availability patterns of skilled resources, interaction lengths of various kinds (channel types or skills), and so forth. Thus operational analysis engine 214 may be used to determine an optimal time for reaching a specific person based on patterns determined from historical data; it may be used to determine when (or if) to expose a callback button or link on a web page based on for example inbound call volumes (which can be used to compute an estimate of resources that will be available in a certain period based on an expected call arrival rate and an expected staffing level for that period); or it can be used to select an optimal channel for a given callback based on an analysis of which channels are most successful at different times for the person or class of persons in question. Similarly, intent analysis engine 215 may be used to take an expression of intent (such as, "Get me Bob Sherman"), and to analyze it to determine whether, when, and how to connect the requester with Bob Sherman; such analyses may be based on a host of available data elements, such as stated preferences of the requester, communications capabilities or preferences of Bob Sherman, Bob Sherman's work schedule, corporate security or availability policies, and so forth. Intent analysis engine 215 may determine what channel to use, how many attempts to make before signaling failure, and also what targets to use (sometimes a user will express an intent such as "get me a service expert for dishwashers", and intent analysis engine 215 may determine which resources may be considered for conducting a callback). Similarly, rules engine 213 may be used to store and test a plurality of rules set by default, by a specific enterprise, by a requester, or by the system, in order for example to determine using conventional rules-based techniques whether a callback is in fact authorized, or whether it must be scheduled for a later time, and so forth. In some embodiments, one or more instances of rules engine 213, operational analysis engine 214, and intent analyzer 215 may reside and operate on a single machine or even as a single executable program; the three components are shown separately in FIG. 2 and elsewhere in order to highlight their various logical functions within callback clouds of the invention.

Detailed Description of Exemplary Aspects

Figure 3:
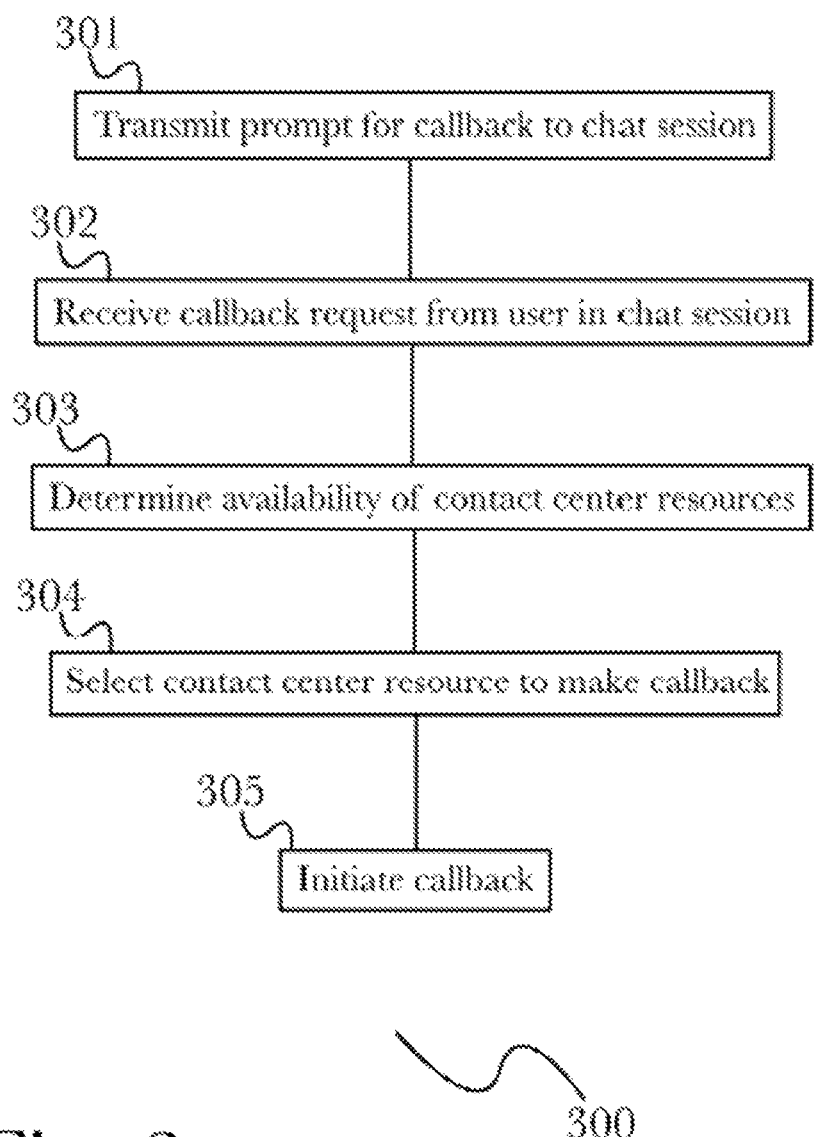
FIG. 3 is a flow diagram illustrating an exemplary method for offering a callback to a chat user, according to one aspect.

FIG. 3 is a flow diagram illustrating an exemplary method 300 for offering a callback to a chat user, according to one aspect. In an initial step 301, an interactive prompt may be transmitted to a chat session such as (for example, including but not limited to) a live chat session between a customer and a contact center agent, or a session between a user and a chat bot. The chat session itself may be operated by a chat server 1001 of the enterprise offering the callback prompt, or it may be an external chat service or application. In a next step 302, a callback request may be received from the user in response to the prompt, confirming the need for a callback to escalate the interaction from the chat to a live call with an agent. In a next step 303, availability may be checked for a plurality of contact center resources, which may include various automated systems such as an IVR or virtual assistant, or contact center agents that may handle customer interactions (for the sake of brevity, reference may be made to contact center agents but it should be understood that any interaction-capable resource may be utilized in place of a live agent according to various aspects of the invention). In a next step 304, an available contact center resource may be selected to handle the requested callback, and then 305 the callback may be initiated.

Figure 4:
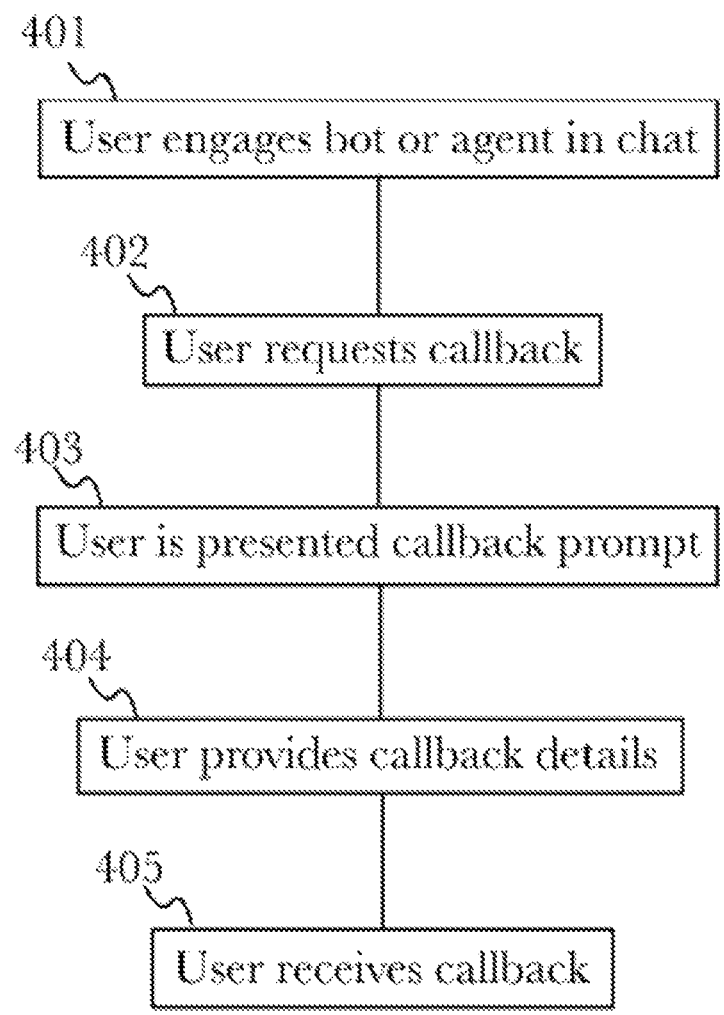
FIG. 4 is a flow diagram illustrating an exemplary method for handling a callback request from a chat user, according to one aspect.

FIG. 4 is a flow diagram illustrating an exemplary method 400 for handling a callback request from a chat user, according to one aspect. In an initial step 401, a user may begin a chat with a live agent or a chat bot, for example either a bot operated by a contact center chat server 1001 or an independent third-party chat bot product or service 1101 that may be either general-purpose or specialized and may optionally be tailored specifically to provide chat support on behalf of a contact center. In a next step 402 the user may request a callback, for example if the chat session has been unable to resolve their concerns or to reach an appropriate support channel for an issue outside the scope of the agent or bot handling the chat session. In a next step 403, the user may be presented with a callback prompt to collect necessary information 404 for fulfilling the callback, such as their contact information or callback preferences such as (for example, including but not limited to) when they wish to be called back or specifying their preferred language. After the user submits the needed information 404, they may then be called back 405 in accordance with the provided details (for example, calling them on the phone number they provided, at the time they requested, in the language they specified).

Figure 5:
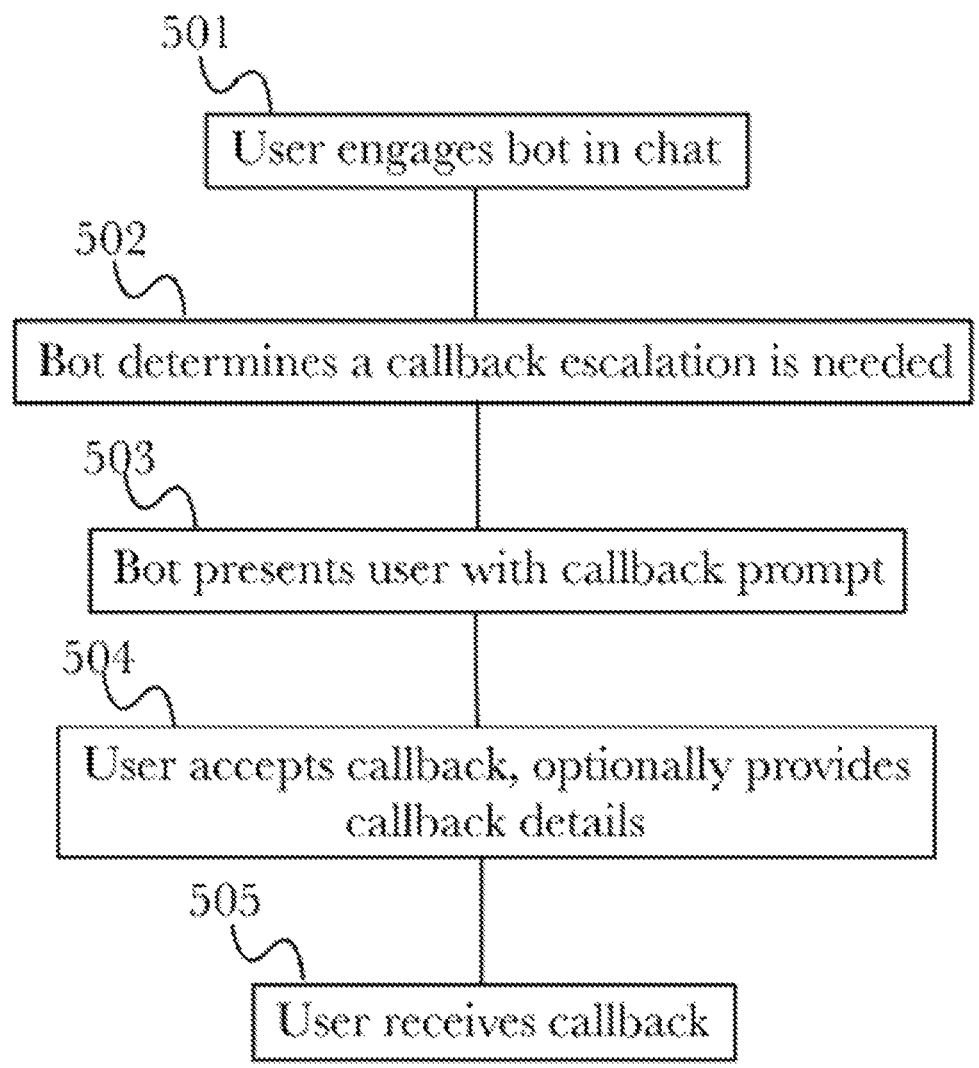
FIG. 5 is a flow diagram illustrating an exemplary method for offering a callback to a chat user using a chat bot, according to one aspect.

FIG. 5 is a flow diagram illustrating an exemplary method 500 for offering a callback to a chat user using a chat bot, according to one aspect. In an initial step 501, a user may interact with a chat bot operated either by a contact center chat server 1001 or an independent chat product or service 1101. During the chat session, the bot may determine that a callback is appropriate 502, for example if the user indicates that their issue is outside the scope of the bot's capabilities or if the conversation with the user indicates that an escalation is required (for example, escalation may be triggered by a number of configurable parameters and using various approaches such as keyword spotting or natural language processing to determine the sentiment of the user). The bot may then 503 offer a callback prompt to the user, and if the user accepts 504 they may provide any necessary callback details such as contact information or preferences. The user may then be called back 505 in accordance with any provided preferences, so they may speak to a live agent to continue the interaction.

Figure 6:
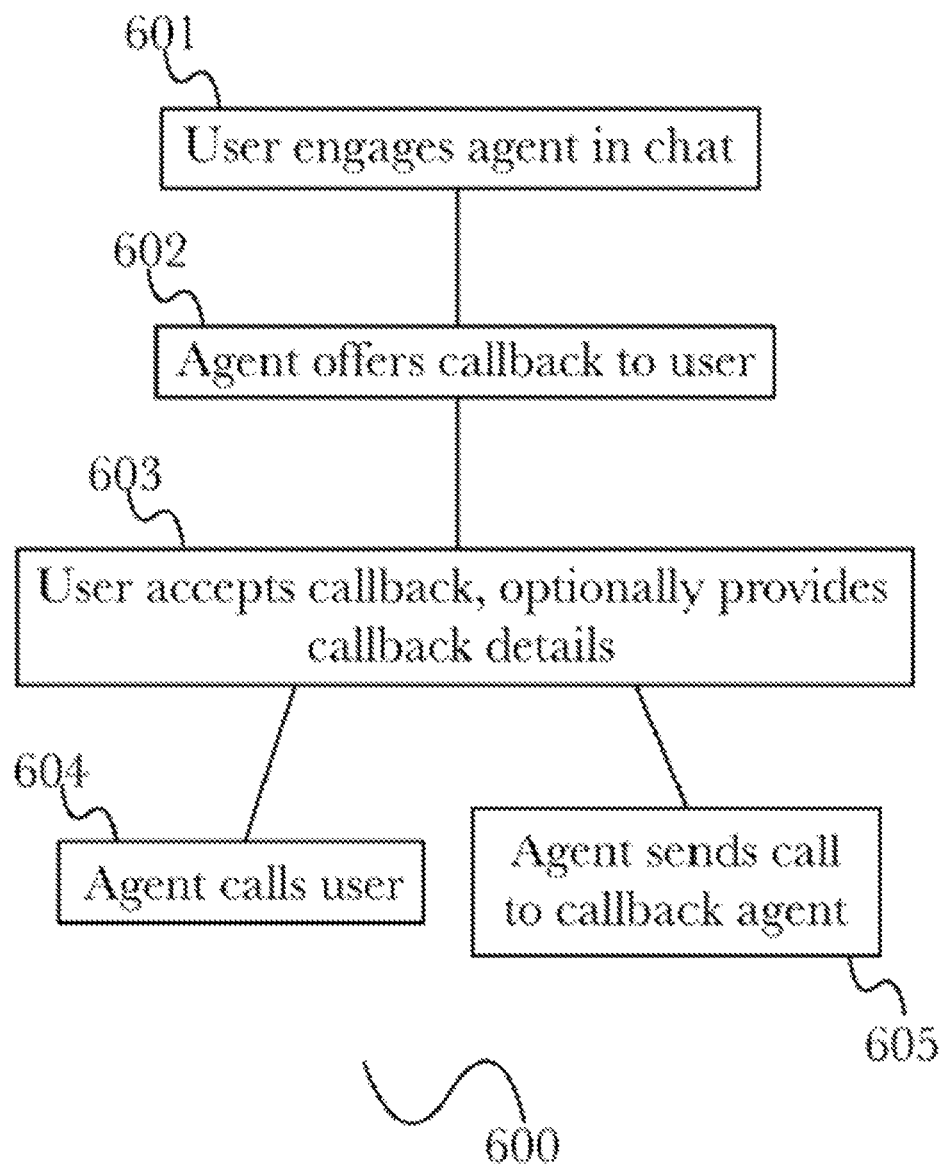
FIG. 6 is a flow diagram illustrating an exemplary method for offering a callback to a chat user during a live chat, according to one aspect.

FIG. 6 is a flow diagram illustrating an exemplary method 600 for offering a callback to a chat user during a live chat, according to one aspect. In an initial step 601, a user may engage a contact center agent via chat, for example using a chat app or service provided by a contact center chat server 1001. During the chat, the agent may offer a callback to the user 602, for example to connect the user with the appropriate department to handle their concern or to handle specific issues that may not be possible via chat (for example, for security purposes a call may be required for specific issues such as to request the user's personal information or for voice confirmation of a user's identity). If the user accepts 603 they may then provide any necessary callback details such as contact information or preferences, and then the agent may call the user 604 or when appropriate (for example, to connect the user to another department) they may send the callback information to another agent for proper handling 605.

Figure 7:
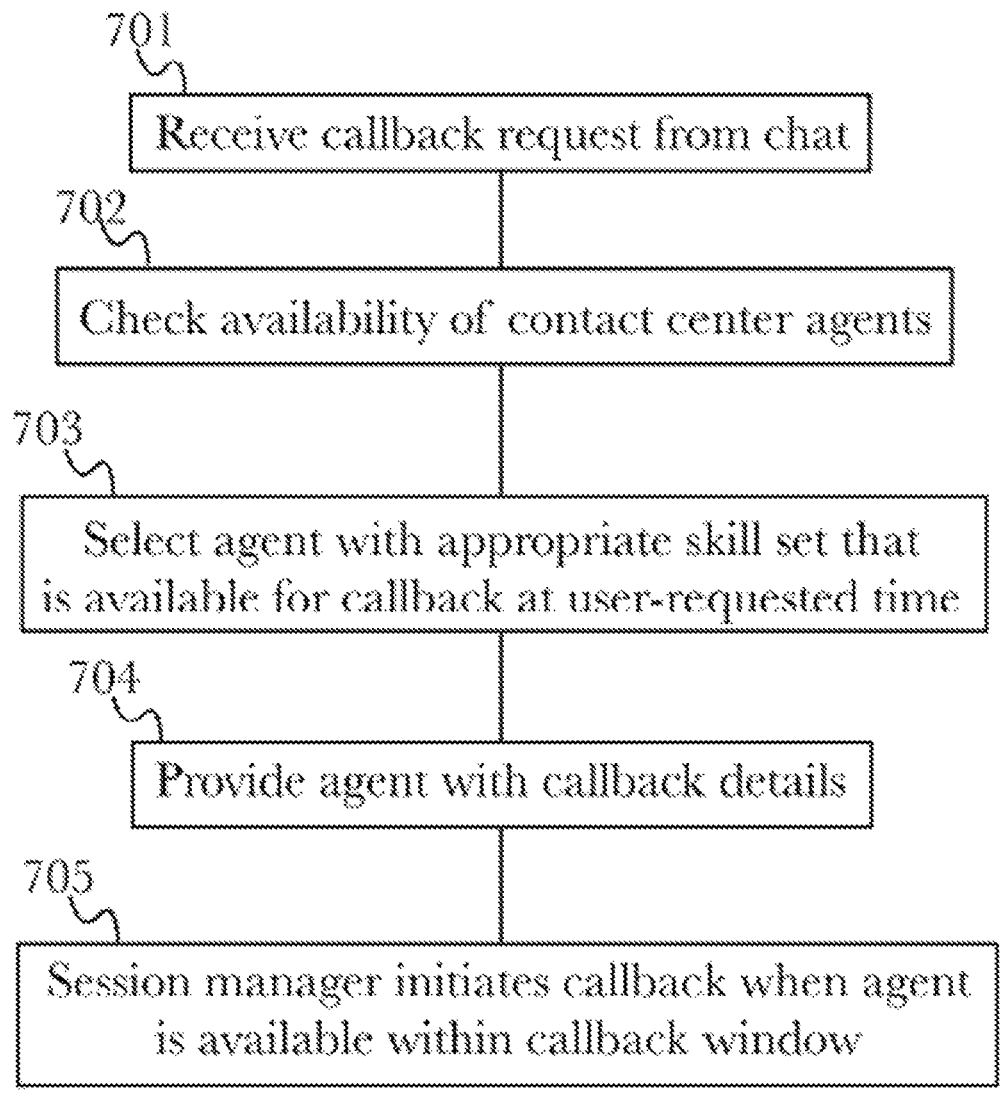
FIG. 7 is a flow diagram illustrating an exemplary method for selecting an agent to fulfill a callback request from a chat user, according to one aspect.

FIG. 7 is a flow diagram illustrating an exemplary method 700 for selecting an agent to fulfill a callback request from a chat user, according to one aspect. In an initial step 701, a contact center may receive a callback request from a chat session, which may be either a user-requested callback or a callback that was offered to a customer (and accepted) by an agent or chatbot. The contact center may then check for agent availability 702 to handle the callback, taking into consideration any relevant preferences included in the callback request such as (for example, including but not limited to) the reason for the callback, the customer's preferred language, or a specific requested time for callback. The contact center may then select an appropriate agent 703 based on the callback requirements, and provide the callback details to the agent 704 so they may handle the interaction. When the agent becomes available within the desired callback scheduling window (which may be "immediately" or at a future-dated time), a session manager 212 may then initiate the callback 705 and connect the agent and customer.

Figure 8:
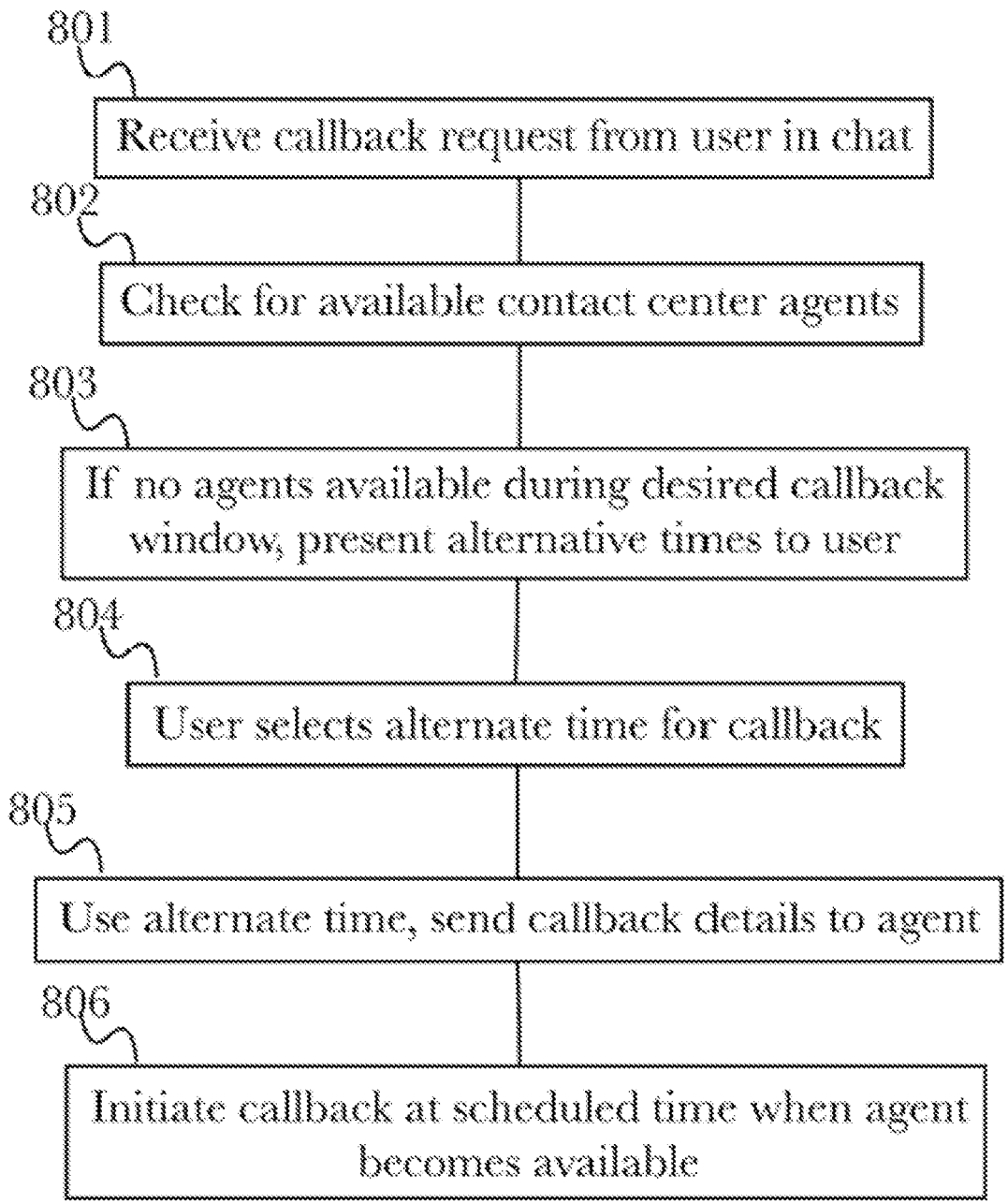
FIG. 8 is a flow diagram illustrating an exemplary method for scheduling a callback request for a chat user, according to one aspect.

FIG. 8 is a flow diagram illustrating an exemplary method 800 for scheduling a callback request for a chat user, according to one aspect. In an initial step 801, a contact center may receive a callback request from a user in a chat session with a live agent or a chat bot, for example either a bot operated by a contact center chat server 1001 or an independent third-party chat bot product or service 1101 that may be either general-purpose or specialized and may optionally be tailored specifically to provide chat support on behalf of a contact center. The contact center may check for agent availability 802 to handle the requested callback, and if no agents are available 803, the contact center may respond by presenting the user with a plurality of alternate times to schedule a callback, selected from anticipated future agent availability. The user may then select a time to be called back 804, which the contact center may then send to an agent 805 along with any additional callback details such as the user's contact information or preferences, and the callback may then be initiated 806 at the future time when the agent becomes available.

FIG. 9 is a flow diagram illustrating an exemplary method 900 for using multiple contact centers to fulfill a chat request from a chat user, according to one aspect. In an initial step 901, a contact center may receive a callback request from a user in a chat session with a live agent or a chat bot, for example either a bot operated by a contact center chat server 1001 or an independent third-party chat bot product or service 1101 that may be either general-purpose or specialized and may optionally be tailored specifically to provide chat support on behalf of a contact center. The contact center may check for agent availability 902 to handle the requested callback, and if no agents are available 903, the contact center may then notify a session management server of a callback system (either on-premises or cloud-based, as described above with reference to FIGS. 1-2 and FIG. 10), which may begin querying additional contact centers in a multi-tenant arrangement. If an available agent is found at any of the contact centers 904, the callback may be provided to that contact center for proper handling according to the methods described above (referring to FIGS. 3-8), and if no agent is found at any contact center 905, the session management server may schedule a future callback as described previously in FIG. 8.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
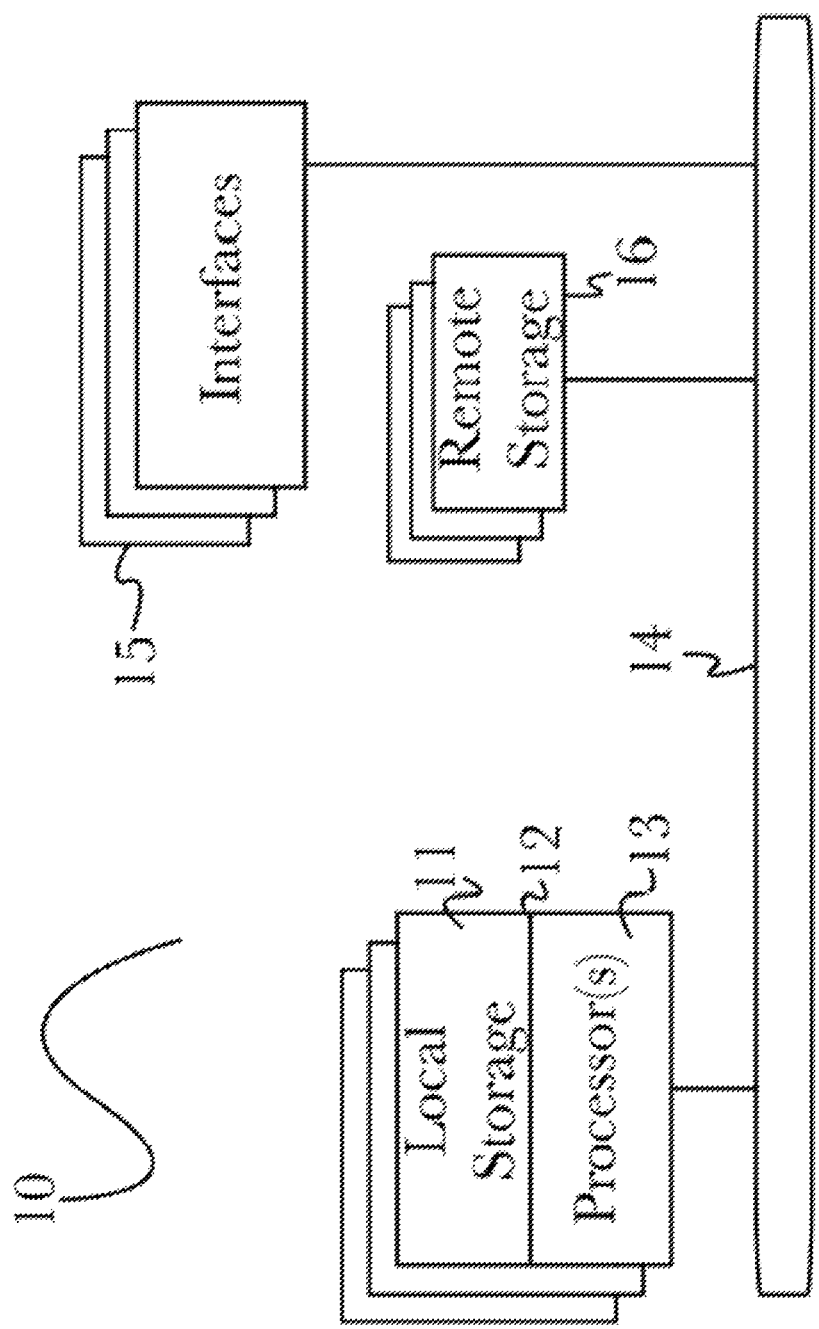
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 13 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
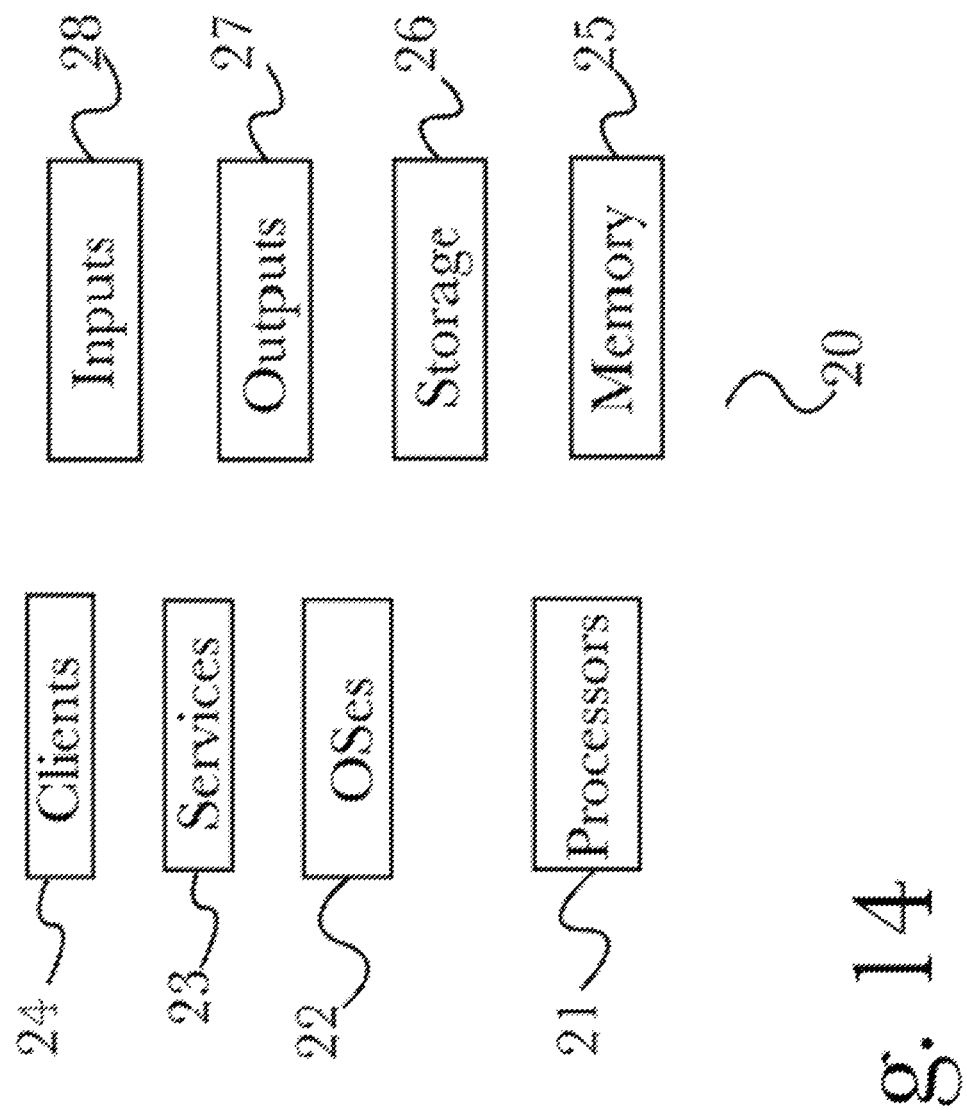
FIG. 14 is a block diagram illustrating an exemplary logical architecture for a client device.

In some aspects, systems may be implemented on a standalone computing system. Referring now to FIG. 14, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
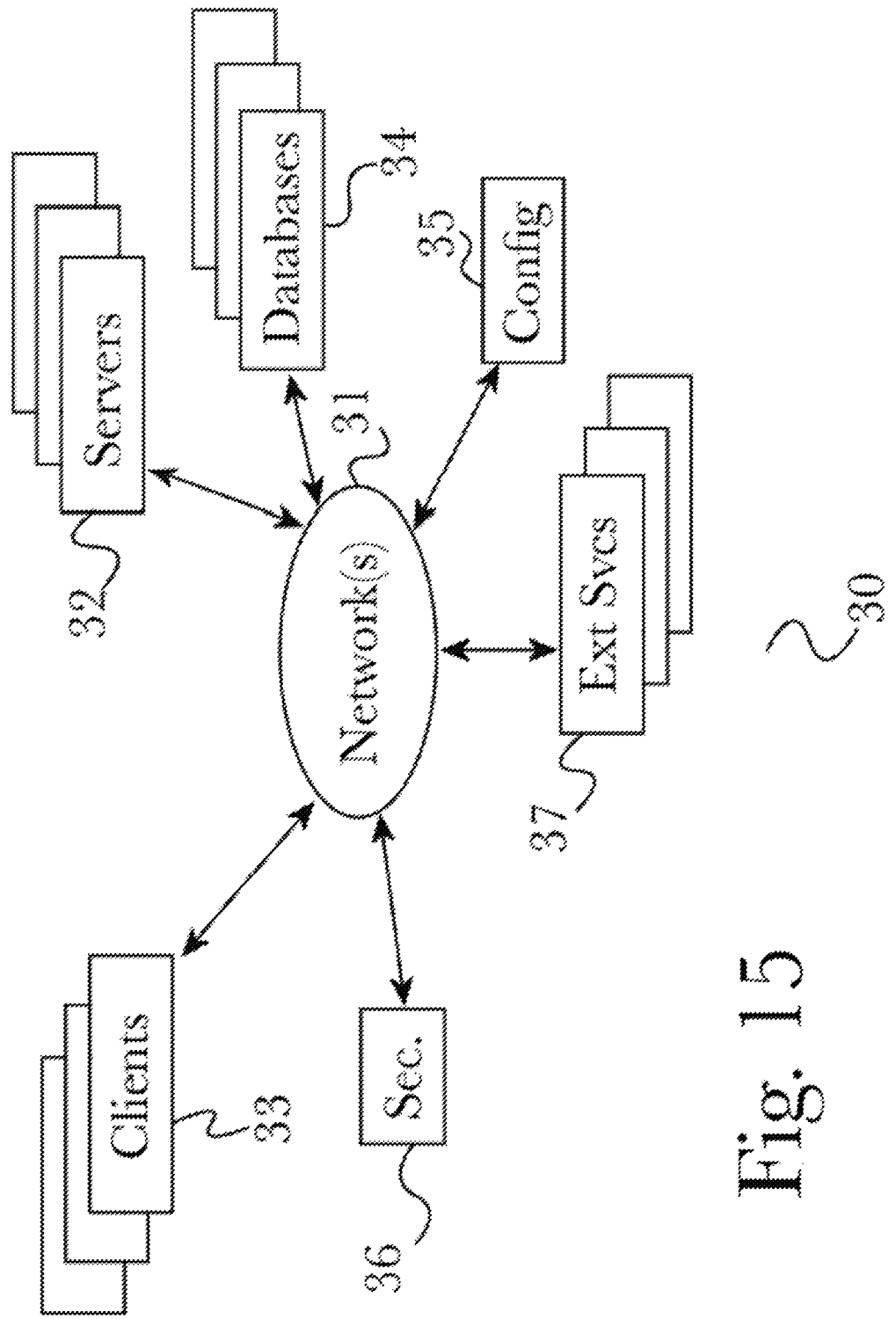
FIG. 15 is a block diagram showing an exemplary architectural arrangement of clients, servers, and external services.

In some aspects, systems may be implemented on a distributed computing network, such as one having any number of clients and/or servers. Referring now to FIG. 15, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 14. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 16:
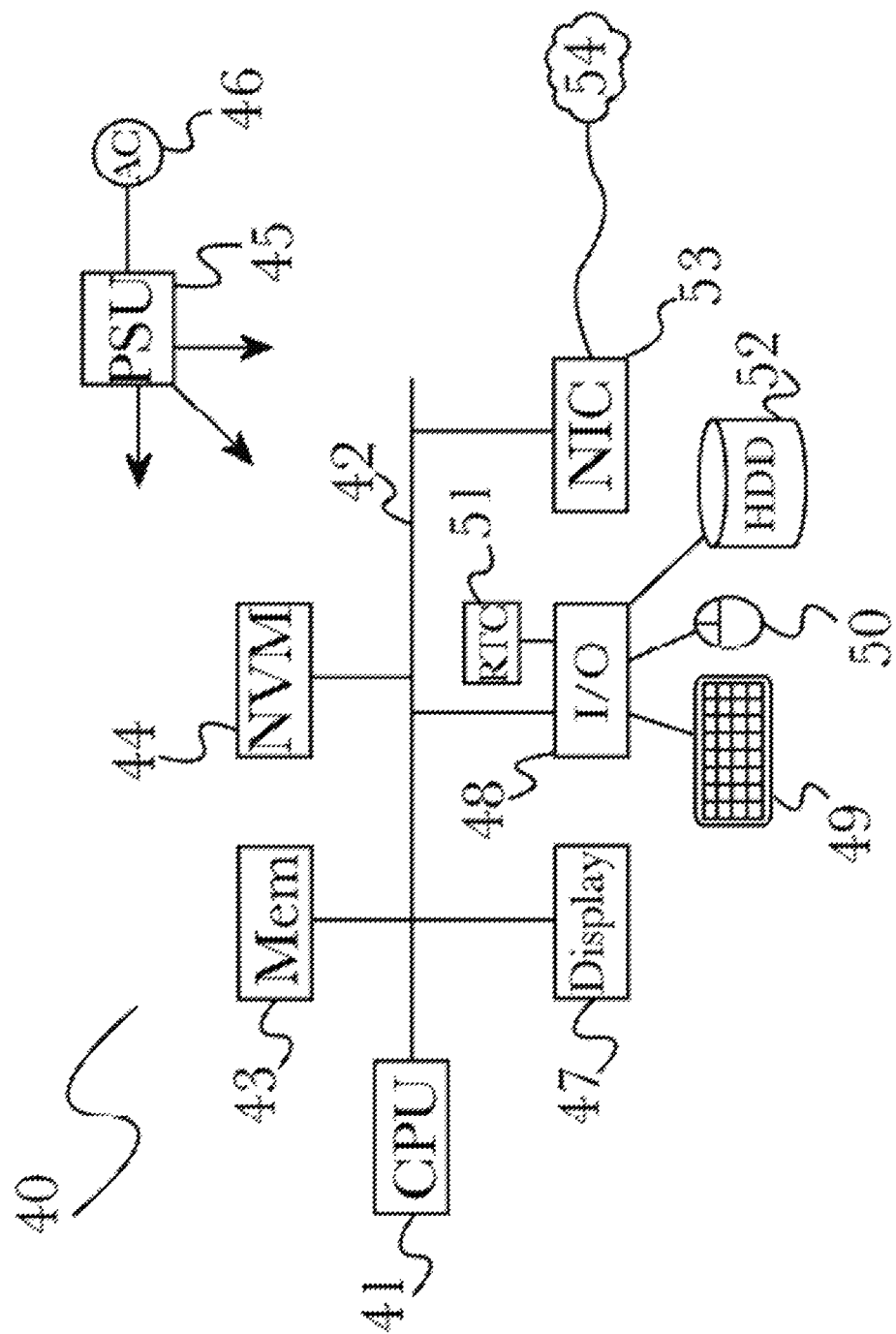
FIG. 16 is another block diagram illustrating an exemplary hardware architecture of a computing device.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for providing chat-based customer callbacks, comprising:
   a callback application server comprising a memory and a processor;
   an interaction manager comprising a first plurality of programming instructions stored in the memory of, and operating on the processor of, the callback application server, wherein the first plurality of programming instructions, when operating on the processor, cause the callback application server to:
      determine callback availability for agents in a contact center, the callback availability being based on analysis of historical data at the contact center, wherein the historical data includes at least one of call arrival rates associated with each agent, callback request and callback completion rates associated with each agent, availability pattern of each agent, and interaction length associated with each agent;
      select an agent from a subset of agents, wherein the subset of agents is selected from the agents in the contact center based on the determined callback availability, wherein the subset of agents includes at least one agent identified by a user; and
      direct the callback application server to initiate the callback from the selected agent to the user, using a session manager of the callback application server; and
   an intent analyzer comprising a second plurality of programming instructions stored in the memory of, and operating on the processor of, the callback application server, wherein the second plurality of programming instructions, when operating on the processor, cause the callback application server to:
      establish a chat session between the user and a chat bot; wherein the chat bot:
      receives a communication from the user with the callback request, wherein the communication includes a request for the one agent; and
      upon receipt of the callback request from the user, directs the callback request to the interaction manager.

2. The system of claim 1, wherein the chat bot is configured to present an interactive prompt that comprises a link to a callback request form.

3. The system of claim 1, wherein the callback request comprises customer contact information.

4. The system of claim 1, wherein the intent analyzer is further configured to determine a channel of communication to communicatively couple the user with the one agent.

5. The system of claim 4, wherein the determination of the channel is based on a stated preference by the user.

6. The system of claim 4, wherein the determination of the channel is based on communication capabilities of the one agent.

7. The system of claim 4, wherein the determination of the channel is based on a work schedule associated with the one agent.

8. The system of claim 4, wherein the determination of the channel is based on corporate security.

9. The system of claim 1, wherein the intent analyzer is further configured to determine a number of attempts to make for the callback before triggering a failure signal.

10. A method for providing chat-based customer callbacks, comprising the steps of:
   establishing a chat session between a user and a chat bot, wherein the chat bot operates on a callback application server;
   receiving a communication from the user with a callback request, wherein the communication includes a request for a particular agent;
   determining, using the chat bot, whether the communication falls within the chat
   determining, using an interaction manager, callback availability for agents in a contact center, the callback availability being based on analysis of historical data at the contact center, wherein the historical data includes at least one of call arrival rates associated with each agent, callback request and callback completion rates associated with each agent, availability pattern of each agent, and interaction length associated with each agent;
   selecting an agent from a subset of agents, wherein the subset of agents is selected from the agents in the contact center based on the determined callback availability, wherein the subset of agents in the contact center includes the particular agent; and
   performing a requested callback from the selected agent to the user using the callback application server.

11. The method of claim 10, wherein the chat bot is configured to present an interactive prompt that comprises a link to a callback request form.

12. The method of claim 10, wherein the callback request comprises customer contact information.

13. The method of claim 10 further comprising determining a channel of communication to communicatively couple the user with the particular agent.

14. The method of claim 13, wherein the determination of the channel is based on a stated preference by the user.

15. The method of claim 13, wherein the determination of the channel is based on communication capabilities of the particular agent.

16. The method of claim 13, wherein the determination of the channel is based on a work schedule associated with the particular agent.

17. The method of claim 13, wherein the determination of the channel is based on corporate security.

18. The method of claim 10 further comprising determining a number of attempts to make for the callback before triggering a failure signal.

* * * * *